July 17, 1923.

H. L. WEBER

DISPENSING APPARATUS

Filed June 27, 1921

H. L. WEBER

DISPENSING APPARATUS

Filed June 27, 1921

Inventor
Henry L. Weber.
By [signature]
Attorney

Patented July 17, 1923.

1,461,992

UNITED STATES PATENT OFFICE.

HENRY L. WEBER, OF LOUISVILLE, KENTUCKY.

DISPENSING APPARATUS.

Application filed June 27, 1921. Serial No. 480,752.

*To all whom it may concern:*

Be it known that I, HENRY L. WEBER, a citizen of the United States of America, and resident of Louisville, in the county of Jefferson and State of Kentucky, have invented certain new and useful Improvements in Dispensing Apparatus, of which the following is a specification.

This invention relates to dispensing apparatus intended for delivering fluid, such as gasoline or the like, to purchasers whereby the liquid is automatically measured, after the apparatus has been set to measure a predetermined amount, the said mechanism being automatically effective to return the parts to normal positions for a repetition of the operation upon the manual re-setting of the controlling device, which may be in the nature of a valve.

A still further object of this invention is to produce a measuring apparatus of the character indicated operating by displacement, that is to say, a fluid is introduced into a container which holds the liquid to be dispensed and the liquid so introduced displaces the liquid to be dispensed and it is thereby possible to determine the amount dispensed by determining the amount of liquid delivered to the receptacle which acts to displace the liquid to be dispensed.

Of course it is known that gasoline, coal oil and the like will not mix with water but will rise to the surface of water, and it is the purpose of this inventor to deliver a liquid such as gasoline to a container, and thereafter to admit water to the said container in such quantities as will fulfill the requirements of the purchasers of the gasoline, the water being depended upon to force the gasoline to the dispensing nozzle or pipe where it may be delivered to a purchaser.

It is a further object of this invention to provide a meter for measuring the water delivered to the container, in order that the seller or dispenser may know how much gasoline or fluid has been displaced and forced from the receptacle; and furthermore, it is an object of this invention to provide novel water controlling valves for closing the means of communication from the meter to the container and for opening it, and means associated therewith for opening and closing a discharge opening for drainage of the water from the container, in order that gasoline may flow into the container for charging it for repetitions of the operation. By this apparatus, therefore, it will be possible for an operator to deliver a predetermined quantity of gasoline or the like, by admitting water to the container and thereafter close the delivery of water to the container and simultaneously opening the drain or discharge pipe from the container to permit the water to escape to a predetermined level, after which the valves will be re-set to permit the inflow of water to the container; the invention furthermore including means for guarding against defective operation of the valve which interrupts the discharge of water from the container.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 4 illustrates a plan view of the valve actuated mechanism; and

Figure 5 illustrates a view in elevation of the device shown in Fig. 4, with parts in section.

Figure 1:
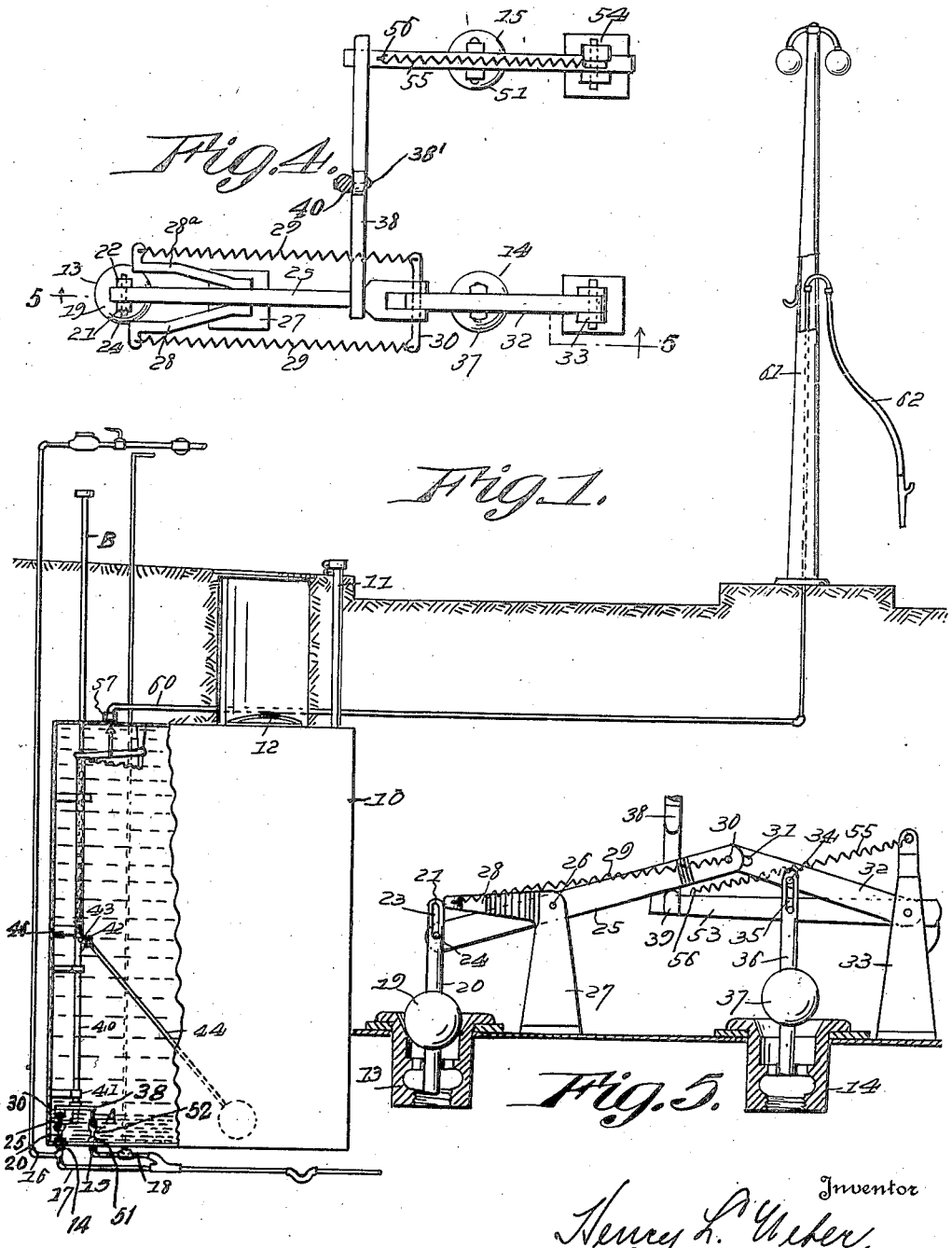
Figure 1 illustrates a view in elevation, partly in section, of a serving station embodying the invention.

In these drawings 10 denotes a tank which is intended to be filled or supplied with gasoline or the like, through the filling pipe 11, and the said tank is also provided with a manhole 12 by which access may be had to its interior.

The tank has valve casings 13, 14 and 15 in its bottom. A water supply pipe 16 is in communication with the valve casing 13, and drain pipes 17 and 18 are in communication with the valve casings 14 and 15 respectively. A valve 19 coacts with the seat of the valve casing 13 for opening and closing passage therethrough, and this valve 19 has a stem 20 with diverging upper ends 21 and 22, each of which is provided with a slot such as 23 in which a pin 24 has movement, the said pin 24 being carried by a lever 25 oscillatably mounted on a pin 26 of a bracket 27 located on the bottom of the tank. The bracket 27 has angularly disposed arms 28 and 28ª to which springs 29 have their ends anchored, the said springs having their opposite ends connected to extensions of the pivotal pin 30 at the opposite ends of the arms, which pivotal pin works in a slot 31 of a link 32 which has its end pivoted to a standard 33 on the bottom of the said tank. The link 32 has a pin 34 working in slots such as 35 formed in the diverging ends of a valve stem 36, which carries the valve 37 into and out of engagement with the seat of the valve casing 14. It will be seen from an inspection of the drawing, that the spring 29 is in such relation to the pivot of the lever 25 as to exert a pull on the lever when the pin 24 is elevated above the axis of the pivot 26, a condition which results in the spring pulling the end of the lever to which the said spring is connected downwardly, and this action serves to elevate the valve 19 from its seat and to close the valve 37, a condition which will result in the admission of water to the tank, and the closing of the discharge or drain valve through the action of the lever 25 on the link 32.

The lever 25 has motion imparted to it by arms 38 and 39 which are moved upwardly or downwardly in the tank, under the influence of a float operating mechanism. The arms are secured on a sleeve or tubular member 40 which is held in operative relation to the remainder of the mechanism by guides such as 41, and the said sleeve has a slotted lug 42 in which a crank 43 operates, the said crank having motion communicated to it through the float arm 44 which is connected to it, the said float arm being provided with a float 45 which is buoyant on water, but which is of such specific gravity as to be unaffected by the buoyancy of gasoline. The crank is rotatable in a bearing or bracket 46 which may extend from the side of the tank in any suitable manner, and the said crank terminates in a shaft 47 on which a gear wheel 48 is secured, the said gear wheel being operative to drive a pinion 49 of the shaft 50 which may lead to any suitable registering mechanism.

Figure 2:
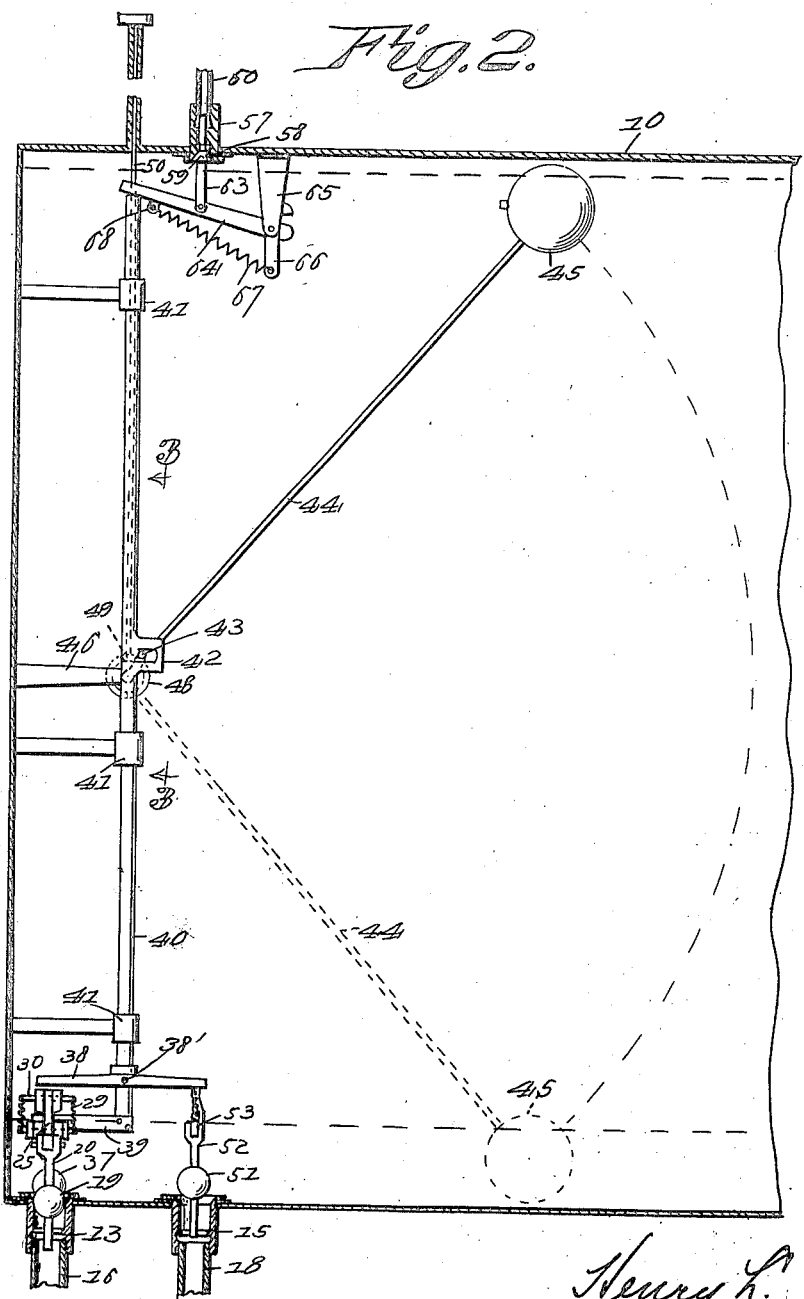
Figure 2 illustrates a sectional view on an enlarged scale of the delivery controlling mechanism.
Figure 3:
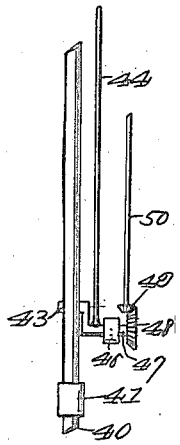
Figure 3 illustrates a detailed view of a float actuated mechanism.

As the crank operates in the lug of the sleeve, the oscillation of the float arm will raise or lower the sleeve, according to the direction of oscillation of the said float arm, and as the arms 38 and 39 are carried by the sleeve, they come into contact with the lever 25, according to the direction of movement of the sleeve. If the sleeve descends to the extent that the arm 38 operates the lever to raise the pin 24 beyond the axis of the pivot 26, the spring 29 will prove effective to accelerate the movement of the lever and hence, the pin 24 will be carried to the top of the slots 21 and further movement of the lever will result in unseating the valve 19, a condition which also causes the seating of the valve 37. If, however, the float reaches the position in which it is shown in Figure 2 in full lines, the arm 39 will act on the lever 25 in the opposite direction, and, of course, when the pin 24 passes the axis of the pin 26, the spring will prove effective in accelerating the movement of the lever 25 in the opposite direction, a condition which will bring the valves 19 and 37 to the positions in which they are shown in Fig. 5. When the parts are in this last mentioned position, the admission of water to the tank is interrupted and the drain opening permits the discharge of water from the tank and it may then be refilled with gasoline to be dispensed.

In the event of failure of the closing of the valve 37 under the influence of the spring, an auxiliary valve 51 is provided for the valve casing 15, and this valve 51 has a stem 52 pivotally connected to a lever 53 which is pivotally mounted on a bracket 54. A spring 55 is connected to the lever at the bracket 54, and the opposite end of the spring is attached to the lever by a fastening 56, so that the said spring 55 overlies the said lever. The bracket 54, however, is of such height as to cause the spring to exert a pull on the end of the lever remote from the bracket, and hence, said spring would be effective to open the valve 51 if pressure were removed from the lever 55, as would occur should the arm 38 be elevated. This valve 51 is a safety or emergency valve which will automatically open with the upward movement of the sleeve carrying the arms 38 and 39.

The valve casing 57, which is in communication with the interior of the tank at the top, has a valve seat 58 adapted to be engaged by the valve 59. The valve 59 is intended to interrupt communication between the interior of the tank and the dispensing pipe 60 which may lead to a stand 61, the said delivery pipe terminating in a dispensing hose 62 of ordinary type.

The valve 59 has a valve stem 63 pivotally connected to a lever 64 which lever is pivoted on a depending bracket 65 within the tank, and the said bracket has an arm 66 to which a spring 67 is connected, the opposite end of the said spring being attached to the lever 64, as shown at 68, the said spring being effective to pull the free end of the lever normally downward, a condition which would result in opening the valve. The lever 64 is, however, in the path of travel of the sleeve 40 and when the said sleeve is carried to the limit of its upward movement by the action of the float arm and the parts associated therewith, the sleeve will press the free end of the lever upwardly and cause the same to close the valve and this will, of course, prevent the escape of fluid from the tank. Provision is made for closing the communication with the delivery pipe, for the reason that when the float has been carried to the full line position in Fig. 1, practically all of the gasoline is forced from the tank and any further communication between the tank and the dispensing pipe would result in the escape of water from the interior of the tank, a condition which is to be obviated.

As will be seen from an inspection of the drawing and from the relation of parts illustrated, the movement of the sleeve to its upward limit results in closing communication for the admission of water to the tank, and it results also in opening the drain pipe for the water within the tank, a condition which permits the water to be almost wholly discharged from the tank. However, means are provided for re-setting the valves to admit water to the tank and prevent the escape of water therefrom, as heretofore described.

When the valve is open for the admission of water to the tank, the parts are re-set for repetition of the operation before described, assuming, of course, that the tank has been filled with gasoline, for in that event, when the operator sets the meter to deliver a certain amount of water to the tank and permits the water to flow into the tank by opening the meter control, the water will then flow into the tank, displacing a certain amount of gasoline and this operation will be repeated until the tank is again emptied.

Provision is made for manually controlling the drainage of the tank to permit the escape of water, as it may be desirable to refill the tank at times before it is completely empty.

To the end just stated, the drain pipe 18 is provided with a valve A which is manually operated by a rod B, and this valve is auxiliary to the mechanically operated valve for this pipe.

I claim:

1. In a dispensing station for fluids lighter than water, a tank, a float therein heavier than the fluid to be dispensed but buoyant on water, a member operated by the float, a dispensing valve adapted to be closed when the float is in one position, a water admission valve controlling water delivered to the tank, a water discharge valve in communication with the tank, and means for operating the valve alternately for closing and opening the same, and means whereby the movement of the valve actuates said valve operating means.

2. In a dispensing station for fluids lighter than water, a tank, a float therein heavier than the fluid to be dispensed but buoyant on water, a member operated by the float, a dispensing valve adapted to be closed when the float is in one position, a water admission valve controlling water delivered to the tank, a water discharge valve in communication with the tank, and means for operating the valve alternately for closing and opening the same, means whereby the movement of the valve actuates said valve operating means, and a valve operating means actuated by the float.

3. In a station for dispensing fluids, means for admitting fluid to the tank heavier than the fluid to be dispensed whereby the heavier fluid displaces the lighter fluid, means for draining the heavier fluid from the tank, means for alternately opening and closing said controlling means, a float heavier than the fluid to be dispensed and lighter than the displacing fluid, means for communicating the motion of the float to the valve controlling means, a dispensing valve and means for closing the said dispensing valve when the float has risen a predetermined degree.

4. In a dispensing station for fluids lighter than water, a tank, a float therein heavier than the fluid to be dispensed but buoyant on water, a member operated by the float, a dispensing valve adapted to be closed when the float is elevated, a water admission pipe in communication with the tank, a water discharging pipe in communication with the tank, a secondary water discharging pipe in communication with the tank, valves for controlling the said water admission and water discharging pipes, and means actuated by the float for moving the said valves and resilient elements coacting with the said valve actuating elements for maintaining the valves in closed positions.

5. In a dispensing station for fluids lighter than water, a tank, a float therein heavier than the fluid to be dispensed but buoyant on water, a distributing pipe, a valve controlling the distributing pipe, means actuated by the float for closing the valve when the float is elevated, a pipe for supplying water to the tank, a drain pipe and a supplemental drain pipe in communication with the tank, a manually operated valve for one of the said drain pipes, mechanically operated valves for each of the drain pipes, a mechanically operated valve for the water delivery pipe, springs for holding the valves closed, and mechanical means operated by the float for actuating the said valves.

6. In a dispensing station for fluids lighter than water, a tank, a float therein heavier than the fluid to be dispensed but buoyant on water, a distributing pipe, a valve controlling the distributing pipe, means actuated by the float for closing the valve when the float is elevated, a pipe for supplying water to the tank, a meter in said pipe, a drain pipe and a supplemental drain pipe in communication with the tank, a manually operated valve for one of the said drain pipes, mechanically operated valves for each of the drain pipes, a mechanically operated valve for the water delivery pipe, springs for holding the valves closed, and mechanical means operated by the float for actuating the said valves.

HENRY L. WEBER.